(12) United States Patent
Nafie et al.

(10) Patent No.: US 7,113,499 B2
(45) Date of Patent: Sep. 26, 2006

(54) WIRELESS COMMUNICATION

(75) Inventors: Mohammed Nafie, Richardson, TX (US); Anand Dabak, Plano, TX (US); Timothy M. Schmidl, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 876 days.

(21) Appl. No.: 09/820,152

(22) Filed: Mar. 28, 2001

(65) Prior Publication Data

US 2001/0048675 A1    Dec. 6, 2001

Related U.S. Application Data

(60) Provisional application No. 60/193,008, filed on Mar. 29, 2000.

(51) Int. Cl.
*H04J 3/24* (2006.01)

(52) U.S. Cl. .................... 370/349; 370/389; 455/513

(58) Field of Classification Search ................ 370/349, 370/328, 252, 276, 277, 279, 329, 332, 333, 370/341, 389, 471, 913; 342/174; 455/513, 455/69, 67.13
See application file for complete search history.

(56) References Cited

U.S. PATENT DOCUMENTS 5,129,098 A * 7/1992 McGirr et al. ................ 455/69
5,282,222 A * 1/1994 Fattouche et al. .......... 375/260
6,633,766 B1 * 10/2003 Van der Pol ................ 455/522

* cited by examiner

*Primary Examiner*—Chi Pham
*Assistant Examiner*—Alexander O. Boakye
(74) *Attorney, Agent, or Firm*—Carlton H. Hoel; W. James Brady, III; Frederick J. Telecky, Jr.

(57) ABSTRACT

A wireless communication transmission channel estimation by initial data exchange to determine calibration factors to apply to tracked channel estimations from received transmissions.

9 Claims, 2 Drawing Sheets

WIRELESS COMMUNICATION

CROSS-REFERENCE TO RELATED APPLICATIONS

This application claims priority from provisional application Ser. No. 60/193,008, filed Mar. 29, 2000.

BACKGROUND OF THE INVENTION

The invention relates to electronic devices, and more particularly to wireless communication.

Demand for wireless information services via cell phones, personal digital assistants (PDAs), and Internet appliances (IA) plus wireless networking among notebook computers is rapidly growing. Various protocols for wireless communication have been proposed, including the WCDMA for cellular systems, Bluetooth for local wireless networking at moderate data rates and low cost, and 802.11 for wireless networking at high data rates (e.g., 20 Mbps). WCDMA has both time division duplex (TDD) and frequency division duplex (FDD) modes of operation; Bluetooth uses slow frequency hopping over roughly 30–80 1-MHz channels but in a TDD mode of alternate master and slave transmissions, and 802.11 has carrier sense multiple access with collision avoidance (CSMA/CA) which is a TDD-like mode of two or more devices using the same channel at different times.

In a TDD system a pair of devices communicating may called a master and a slave and the transmission from master to slave termed the downlink and the transmission from the slave to the master termed the uplink. The master can estimate the channel between the master and slave by analysis of received signals from the slave, and the master can then use such estimates to adjust features of its transmissions, such as code rate, power, information rate, antenna weight adjustment, and so forth. However, the master measures the uplink channel rather than the needed downlink channel. As illustrated in FIG. 2, the uplink channel is composed of the slave power amplifier followed by the physical channel followed by the low noise amplifier of the master; in contrast, the downlink channel is composed of the master power amplifier followed by the physical channel followed by the low noise amplifier of the slave. Although there are many gains and phase shifts associated with all the elements in both the master and slave for both the transmitting and receiving front ends, FIG. 2 lumps these factors generally as "power amplifier" and "low noise amplifier".

The master needs the downlink channel estimate to maximize the throughput of its transmissions to the slave (for example, to use TxAA or STD). It is not easy to match the attenuations and phase shifts in the master and slave amplifiers, and so the channel measured by the master (the uplink channel) will be different than the one the master will use for transmission (the downlink channel) as shown in FIG. 2. This is a problem for current systems.

SUMMARY OF THE INVENTION

The present invention provides a wireless system with a master and/or a slave which employs a calibration method to adjust channel estimates.

This has advantages increasing efficiency of TDD-like transmissions.

DETAILED DESCRIPTION OF THE PREFERRED EMBODIMENTS

1. Overview

Preferred embodiment systems provide for time division duplex (TDD) communication system channel estimation by use of initial channel measurements followed by updates using calibration factors. In particular, a downlink channel estimate is taken equal to an uplink channel measurement adjusted by (presumably) constant calibration factors. Thus when the physical channel changes, the changes apply equally to the uplink and downlink, so measurement of uplink changes alone allows for performing corresponding changes in a downlink estimate. A transceivers communicating over the downlink channel may then adjust its modulator (modulation filter) to optimize transmission on the downlink channel.

2. Preferred Embodiments

Figure 1:
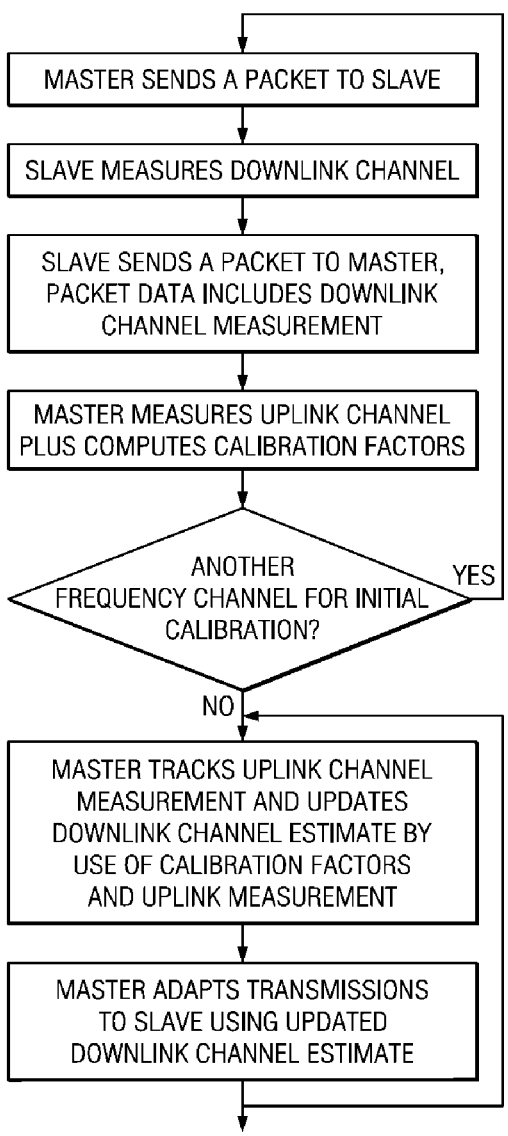
FIG. 1 shows a preferred embodiment flow.

FIG. 1 illustrates the flow for a first preferred embodiment method of channel estimation and use in a master-slave system. The channel estimation may be just the filter coefficient estimation in the receiving matched filter. In more detail, the method proceeds as follows. First, with initial communication between the master and the slave, the master sends a packet to the slave which the slave uses to measure the downlink channel as $$G_{DL} = G_{M\text{-}PA} * \rho * G_{S\text{-}LNA}.$$

$$\theta_{DL} = \theta_{M\text{-}PA} + \theta + \theta_{S\text{-}LNA}.$$

where $G_{DL}$ and $\theta_{DL}$ are the overall downlink gain and phase shift, respectively; $G_{M\text{-}PA}$ and $\theta_{M\text{-}PA}$ are the gain and phase shift of the master power amplifier; $\rho$ and $\theta$ are the physical channel attenuation and phase shift, respectively; and $G_{S\text{-}LNA}$ and $\theta_{S\text{-}LNA}$ are the gain and phase shift of the slave low noise amplifier, respectively. This packet may be transmitted in just one of many frequency channels used (e.g., a frequency hopping system), and other frequency channels are likewise measured.

The slave then sends a response packet to the master, and the master uses the packet reception to measure the uplink channel as $$G_{UL} = G_{S\text{-}PA} * \rho * G_{M\text{-}LNA}.$$

$$\theta_{UL} = \theta_{S\text{-}PA} + \theta + \theta_{M\text{-}LNA}.$$

Figure 2:
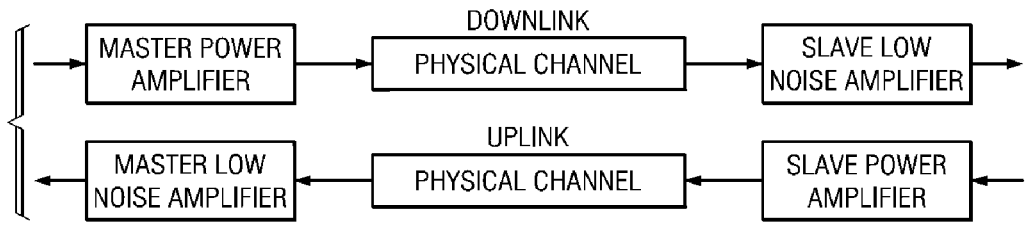
FIG. 2 illustrates uplink and downlink channels.

Analogous to the slave measurements, $G_{UL}$ and $\theta_{UL}$ are the overall uplink gain and phase shift, respectively; $G_{S\text{-}PA}$ and $\theta_{S\text{-}PA}$ are the gain and phase shift of the slave power amplifier; $\rho$ and $\theta$ are again the physical channel attenuation and phase shift, respectively; and $G_{M\text{-}LNA}$ and $\theta_{M\text{-}LNA}$ are the gain and phase shift of the master low noise amplifier, respectively. FIG. 2 compares the uplink and downlink.

The response packet sent by the slave to the master includes as data the slave's downlink channel measurements ($G_{DL}$ and $\theta_{DL}$). The master uses the slave's downlink channel measurements rather than its own uplink channel measurements to adjust its transmission, such as change code rate, information rate, power, antenna weighting, and so forth.

Further, the master computes gain and phase shift calibration factors:

$$C_{gain} = G_{DL}/G_{UP}$$

$$C_{phase} = \theta_{DL} - \theta_{UL}$$

Then when the physical channel changes (master detects this as a change from $G_{UL}$ and $\theta_{UL}$ to $G_{ULnew}$ and $\theta_{ULnew}$), the master applies the calibration factors to update its downlink estimates $G_{DL}$ and $\theta_{DL}$ by:

$$G_{DLnew} = C_{gain} * G_{UPnew}$$

$$\theta_{DLnew} = C_{phase} + \theta_{ULnew}$$

The master then uses the updated downlink channel estimates to adjust its transmissions. Note that only at the beginning of a communication session does the slave need to transmit its channel measurements to the master; after the initial transmission the master adjusts using its uplink measurements together with the calibration factors. However, if the communication system uses more than one frequency channel, such as a frequency hopping system does, then the channel measurements are may in all, or a sampling of, the frequency channels as indicated in FIG. 1.

Figure 3:
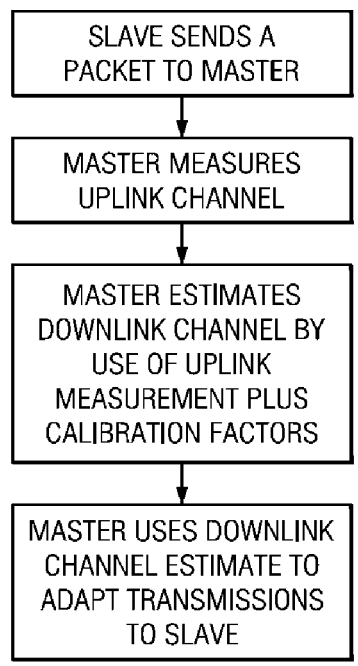
FIG. 3 shows transmission adaptation.

FIG. 3 illustrates a method the master uses monitoring the uplink measurement and adjusting the downlink estimate to changes in the uplink measurements.

Figure 4:
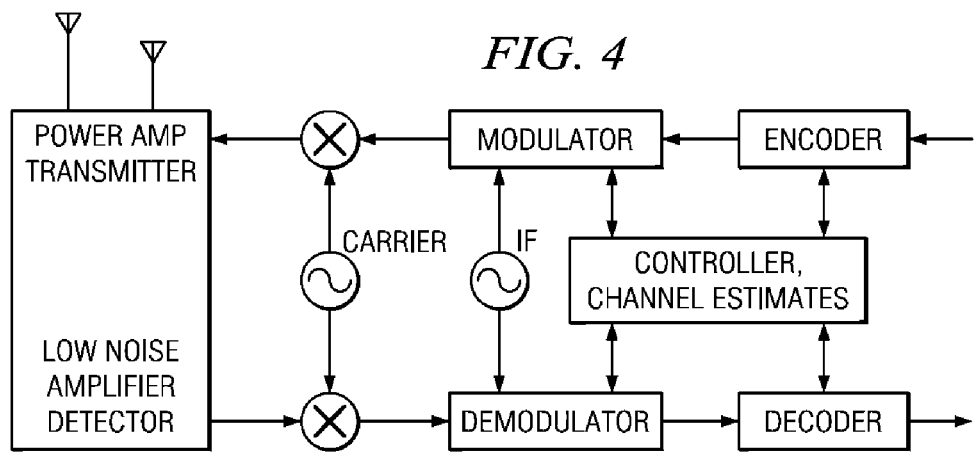
FIG. 4 illustrates a wireless transceiver.

FIG. 4 is a generic transmitter/receiver (transceiver) with a modulator which typically includes a modulation filter for wave shaping to optimize downlink transmission. This wave shaping uses the downlink channel estimates.

The slave can similarly perform calibration computation (using uplink channel information from the master) and track downlink channel measurements to update its uplink channel estimates for more efficient uplink transmissions.

3. Reinitialization Preferred Embodiments

Alternative preferred embodiments have the slave send new channel measurements to the master on a periodic basis so the master can update the calibration factors. The master can compare its updated downlink channel estimates using the old calibration factors and recent uplink measurements with the new downlink channel measurements from the slave and determine how frequently the slave should send new downlink channel measurements.

4. Modifications

The preferred embodiments may be varied while maintaining the features of a transmit channel estimate derived from a receive channel measurement together with a previously computed calibration.

For example, the master and slave may be any two of many devices communicating in a wireless system and all devices use the calibration method. Further, the master and slave devices may be symmetrical or asymmetrical such as the master uses multiple antenna beamforming but not the slave, the master has a modulation filter for optimizing downlink transmissions but the slave does not for uplink transmissions, and so forth.

What is claimed is:

1. A method of wireless communication, comprising the steps of:
   (a) transmitting a first packet on a transmission channel to a transceiver;
   (b) receiving a second packet on a transmission channel from said transceiver, said second packet including information regarding the transmission channel to said transceiver;
   (c) measuring the transmission channel from said transceiver;
   (d) calculating calibration factors for said transmission channel to said transceiver using the information from step (b) and the measurement from step (c); and
   (e) for transmitting a third packet on said transmission channel to said transceiver, estimating said transmission channel to said transceiver from said calibration factors and a second measurement of said transmission channel from said transceiver.

2. The method of claim 1, wherein:
   (a) said calibration factors include a gain factor and a phase shift factor.

3. The method of claim 2, wherein:
   (a) said gain factor is the ratio of an overall gain for transmission to said transceiver divided by an overall gain for transmission from said transceiver.

4. The method of claim 2, wherein:
   (a) said phase shift factor is the difference of an overall phase shift for transmission to said transceiver minus an overall phase shift for transmission from said transceiver.

5. The method of claim 1, wherein:
   (a) said transmitting is in a time division duplex mode.

6. The method of claim 1, wherein:
   (a) said first packet includes a request for said transceiver to respond with information regarding the transmission channel to said transceiver.

7. The method of claim 1, further comprising:
   (a) updates of said information from said transceiver.

8. A wireless communication system, comprising:
   (a) a master transceiver for a communication channel; and
   (b) a slave transceiver for said communication channel;
   (c) wherein said master transmits to said slave using updated estimates for said communication channel when said communication channel measured from transmission received from said slave shows a change in said communication channel, said updated estimates calculated from (i) measurements of said communication channel for transmission received from said slave together with (ii) calibration factors from prior measurements of said communication channel by said slave and by said master where said prior measurements are periodically performed.

9. A wireless communication transceiver, comprising:
   (a) a transmitter;
   (b) a receiver coupled to said transmitter;
   (c) said transmitter including a channel estimator and a wave shaper for transmitting to a transceiver, wherein said channel estimator estimates the channel to said transceiver from measurements of the channel from said transceiver together with calibration factors from channel information received from said transceiver.

* * * * *